Patented Oct. 8, 1929

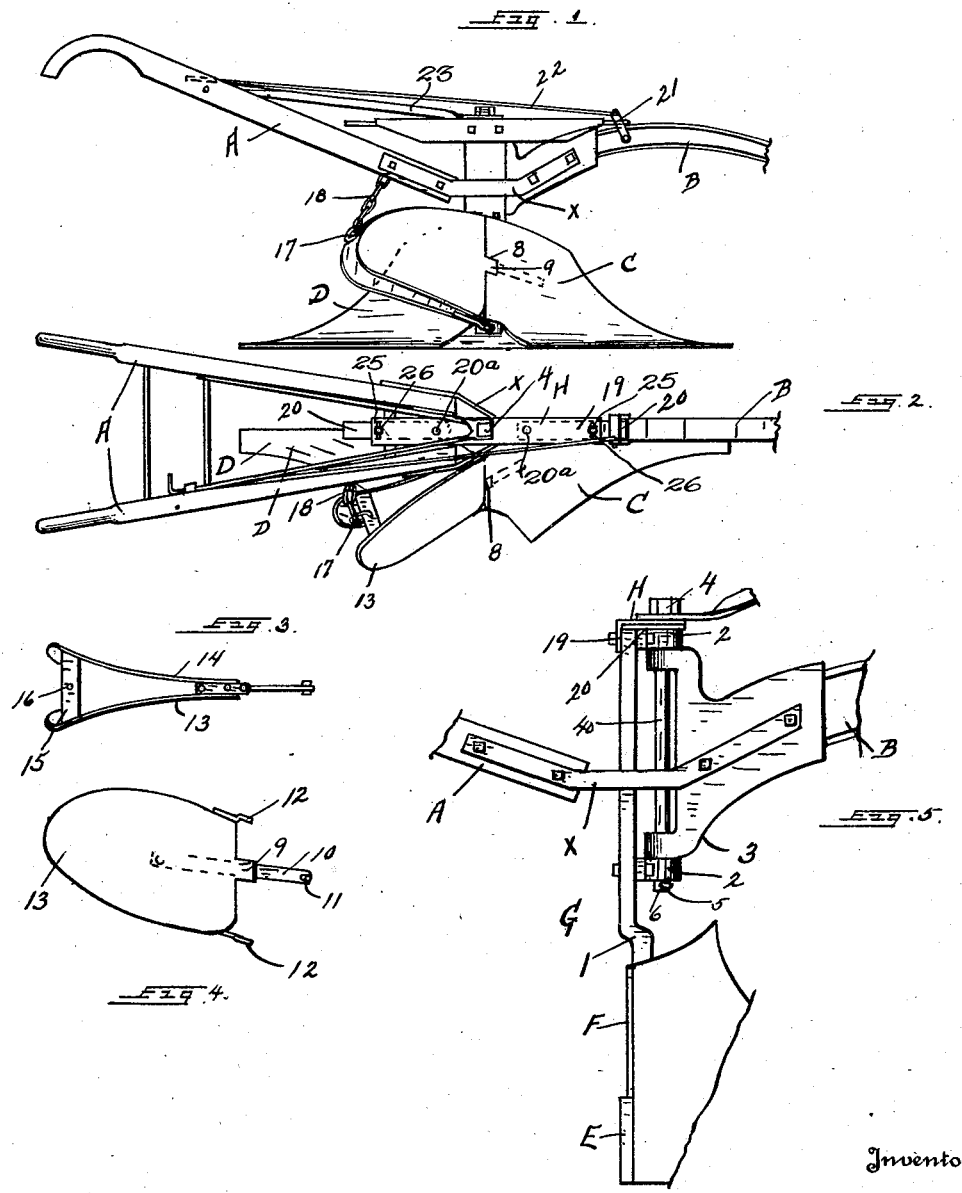

1,730,476

UNITED STATES PATENT OFFICE

ZENOS PORTER, OF PROVO, UTAH

REVERSIBLE WALKING PLOW

Application filed June 13, 1927. Serial No. 198,416.

My invention relates to plows and has for its object to provide a new and efficient reversible walking plow.

A further object is to provide a walking plow which is economical to build and which will plow along one side of a piece of ground with only turning at the ends of the furrow and one which will reverse when desired and plow back along the same furrow throwing the dirt all in one direction.

A still further object is to provide a new reversible walking plow which will plow a piece of ground without leaving a dead furrow down the piece of land and without the unnecessary trampling of the ground on the four corners of the land due to turning.

A still further object is to provide a plow of the reversible type wherein the right and left hand mold boards are provided with a reversible hingedly supported wing with means for reversing the position of the wing when the handles and beam are reversed.

These objects I accomplish with the device illustrated in the accompanying drawings in which similar numerals and letters of reference indicate like parts throughout the several views and as described in the specification forming a part of this application and pointed out in the appended claim.

In the drawings in which I have shown the best and most preferred manner of building my invention Figure 1 is a side elevation of the plow. Figure 2 is a plan view of the same. Figure 3 is a detail plan view of the reversible wing. Figure 4 is a side elevation of the same. Figure 5 is an enlarged view of the hinge connection between the handles and beam and the standard of the plow.

In the drawings I have shown the handles of the plow as A, the beam as B, the right hand mold board as C and the left hand mold board as D. Along the back side of the mold boards I provide a land side E which fits against the upright G and a cover plate F is secured to the upright G above the land side E to exclude foreign material therefrom.

The said upright G has an offset 1 above the top side of the plate F to place the draft of the plow in the correct position. Hinged connections 2 are provided on one side of the standard G and the end of the beam is provided with hinge connections 3 which are held to the hinge 2 by the pivot pin 4. The said pin 4 is provided with a hole 5 through the lower end thereof and a cotter pin 6 is passed therethrough to hold the hinge together. This hinge connection forms the contact and connection between the handles and beam and the standard of the plow and is the means on which the handles and beam are turned when reversing the plow.

I then cut a square hole 8 in the back side of the place of connection between the two mold boards C and D and provide a protruding brace lug 9 on the hinge end of the reversible wings W, to fit the hole 8 and to entirely fill said hole when the wings have been reversed. The said hole 8 is cut to allow the passage therethrough of a retaining brace bar 10 which is also provided on the end of the lug 9, and which brace steadies and braces the wings W when they are in use, and an adjustable nut and bolt 11 is passed through the end of the said bar 10 to provide for different adjustment of the angle at which the wings W operate when plowing. The said wing portion W is made up of two opposedly directed spaced apart portions 13 and 14 secured together by suitable brackets and are slightly curved away from each other to take the general form of the commonly known wing of the mold board plow. A brace bar 15 is secured across between the rear ends of the said portions 13 and 14 and has a hole 16 bored therethrough through which hole the end link 17 of a chain 18 is passed and secured. The other end of the said chain 18 is secured to the handles A and when the handles are turned or pivoted with the beam B on the pin 4, the chain moves the wings W and they are turned from side to side as the handles turn, thereby providing the means by which the wing is turned in conjunction with the reversing of the handles and beam to plow back along the same furrow. Suitable braces X are provided between the handles A and the beam B to give the necessary rigidity and strength.

A catch or retaining bar H is secured on the top end of the standard G and is made of a piece of angle iron 19 with a straight bar 20 secured on each end thereof by the bolts 20ª, with the bar 20 protruding a small portion on each end of the angle iron 19. A slot 25 is cut in the said angle iron 19 near each end thereof and a bolt 26 secures the other end of the bar 20 to the end of the iron 19 being passed through the slot 25. The bolt 20ª holds the end of the bar 20 rigid and the slot and bolt 26 provide for side movement or adjustment of the free end of the bar 20, so that the draft of the plow may be regulated to some extent by the movement of the bar 20 in either direction by loosening the bolt 26 sufficiently to move the bar and the desired adjustment may be made in either direction as required. The bolt 26 is then again tightened and the plow draft having been changed the plow is again ready for use. Both ends of the said bar H are provided with the same bar 20 and the same adjustment features.

A U-shaped catch 21 is secured on the beam B and is operated by the driver of the plow by a shift rod 22, which has one end secured to the said catch 21, and the other end is slidably secured to one of the handles of the plow. The said U-shaped catch 21 is adapted to be brought backward over the top and end of the bar 20 when the plow has been reversed and is ready to plow back up the same furrow. Braces 23 secure the top of the handles A to the pivot pin 4 and are revoluble therearound.

The mold boards C and D of the plow are of the usual type and variable as to the needs and the type of land being plowed.

It will be obvious that slight modifications may be made in the invention without departing from the spirit of the invention and the scope of the claim.

The operation of my device is as follows:—

The operator driving his team along the furrow desires to turn at the end of the piece of land being plowed and plow back up the same furrow. He pushes front on the shift rod 22 releasing the handles and the beam from the bar H and its coacting parts. The handles and the beam are thereby released and the team may be turned thereby revolving the handles and beam around the pin 4 and as they are turned the chain 18 reverses the wings W so that when the team is turned the wings have been reversed and the handles and beam are pointing in the opposite direction and the catch 21 is then caught over the end of the other bar 20 by pulling the bar 22 backward and toward the driver. The plow is thereby reversed ready to be driven back up the same furrow always throwing the soil in the same direction.

Having thus described my invention I desire to secure by Letters Patent and claim:—

In a device of the class described the combination of a base member consisting of two oppositely directed mold board plows integral with each other; an upright secured thereto at the medial portion between the two outer ends of said plow; a hinge on said upright; handles and a beam secured together; a hinge secured to said handles; a pin through said hinge members connecting the upright and the handles and beam together for rotation of the handles and beam around one side of said upright to change the direction of the plow; a retaining bar secured to said upright; and a catch secured on said beam adapted to catch said retaining bar and hold it in either direction as desired.

In testimony whereof I have affixed my signature.

ZENOS PORTER.